US007324960B2

(12) United States Patent
Enoki et al.

(10) Patent No.: US 7,324,960 B2
(45) Date of Patent: Jan. 29, 2008

(54) POS SYSTEM

(75) Inventors: Shigeki Enoki, Kawasaki (JP); Jun Makiya, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 495 days.

(21) Appl. No.: 09/976,153

(22) Filed: Oct. 15, 2001

(65) Prior Publication Data

US 2002/0065727 A1    May 30, 2002

(30) Foreign Application Priority Data

Nov. 30, 2000 (JP) ............................. 2000-365866
Apr. 13, 2001 (JP) ............................. 2001-115975

(51) Int. Cl.
| G06G 1/12 | (2006.01) |
| G06G 1/14 | (2006.01) |
| G06F 19/00 | (2006.01) |
| G06Q 20/00 | (2006.01) |
| G06Q 30/00 | (2006.01) |
| G06Q 90/00 | (2006.01) |

(52) U.S. Cl. ........................... 705/21; 705/22; 235/385
(58) Field of Classification Search ............. 705/15–34
See application file for complete search history.

(56) References Cited

U.S. PATENT DOCUMENTS

| 4,319,326 A * | 3/1982 | Uchida ........................ 705/21 |
| 5,189,607 A * | 2/1993 | Shirasaki et al. ............. 705/21 |
| 5,978,774 A * | 11/1999 | Rogers et al. ................ 705/24 |
| 6,016,480 A * | 1/2000 | Houvener et al. ............. 705/21 |
| 6,463,421 B2 * | 10/2002 | Junger ......................... 705/28 |
| 6,536,659 B1 * | 3/2003 | Hauser et al. ............... 235/375 |
| 6,970,826 B2 * | 11/2005 | Christensen et al. ........... 705/1 |
| 2001/0032141 A1 * | 10/2001 | Drattell ....................... 705/26 |
| 2002/0019785 A1 * | 2/2002 | Whitman ..................... 705/28 |

FOREIGN PATENT DOCUMENTS

JP         58-168175        10/1983

(Continued)

*Primary Examiner*—F. Zeender
*Assistant Examiner*—Mussa Shaawat
(74) *Attorney, Agent, or Firm*—Kratz, Quintos & Hanson, LLP.

(57) ABSTRACT

A POS system including at least one store server and a plurality of POS terminals. Each POS terminal includes means for transmitting transaction data to the store server as a transaction occurs at the POS terminal, means for querying the store server for transaction data relating to a transaction that occurred at another POS terminal, means for instructing the store server to cancel the transaction that occurred at the other POS terminal, and means for executing a transaction cancel instruction received from the store server to cancel a transaction that occurred at the POS terminal, and the store server includes means for receiving a transaction cancel instruction from a POS terminal other than the POS terminal at which the transaction occurred, and for transferring the transaction cancel instruction to the POS terminal at which the transaction occurred. With this configuration, the POS system allows any transaction, including a sales transaction, originally registered at any POS terminal, to be canceled through any other POS terminal in the POS system. It is also possible to correct transaction data without canceling the entire transaction. As a result, transaction data can be readily corrected when an operator's input error is found or when a purchased product is returned by a customer, and an easy-to-operate POS system can thus be provided.

5 Claims, 13 Drawing Sheets

FOREIGN PATENT DOCUMENTS

| | | |
|---|---|---|
| JP | 60-114958 | 6/1985 |
| JP | 61-196364 | 8/1986 |
| JP | 2-56696 | 2/1990 |
| JP | 2-236795 | 9/1990 |
| JP | 5-225452 | 9/1993 |
| JP | 6-4886 | 1/1994 |
| JP | 7-168976 | 7/1995 |
| JP | 7-210729 | 8/1995 |
| JP | 7-262458 | 10/1995 |
| JP | 7-282357 | 10/1995 |
| JP | 10-188141 | 7/1998 |
| JP | 10-302165 | 11/1998 |
| JP | 11-66436 | 3/1999 |

* cited by examiner

| POS NUMBER POS(i) | TRANSACTION SERIAL NUMBER TR(n) | TRANSACTION DATA abc ⋯ |
|---|---|---|

POS SYSTEM

BACKGROUND OF THE INVENTION

1. Field of the Invention

The present invention relates to POS systems used in volume retail stores such as supermarkets, department stores, specialty stores, and the like, and more particularly to a POS system having a novel configuration that facilitates the process of canceling or correcting transaction data once registered at a POS terminal used as an electronic cash register.

2. Description of the Related Art

At a volume retail store, such as a supermarket, a department store, a specialty store, or the like, sales transactions are handled using a POS system which includes usually one store server and a plurality of POS terminals. A customer who wishes to purchase a product takes the product to a nearby POS terminal (cash register) in the store. The sales clerk (operator) enters the details of the purchased product into the POS terminal to register the transaction, and issues a receipt describing the details of the purchase and hands it over to the customer.

There is, however, the possibility that the operator may make an input error when entering the data on the purchased product into the POS terminal. If the operator notices the error while entering the data into the POS terminal, the details of the transaction can be easily corrected, for example, by deducting the erroneously entered price and re-entering the correct value.

However, when the customer notices the error after the receipt is issued to the customer and the transaction completed, or when it becomes necessary to correct the transaction data, for example, as a result of the purchase being returned by the customer, the transaction itself must be canceled and the correct data must be re-entered. This operation cannot be performed at POS terminals other than the POS terminal that registered the original transaction, that is, the POS terminal that issued the receipt for the purchased product.

This is because each POS terminal has a means of its own for recording a sales history, so that if the correction was made at a POS terminal other than the POS terminal used to register the sale, a discrepancy would occur in the amount of sales registered at that terminal.

Figure 1:
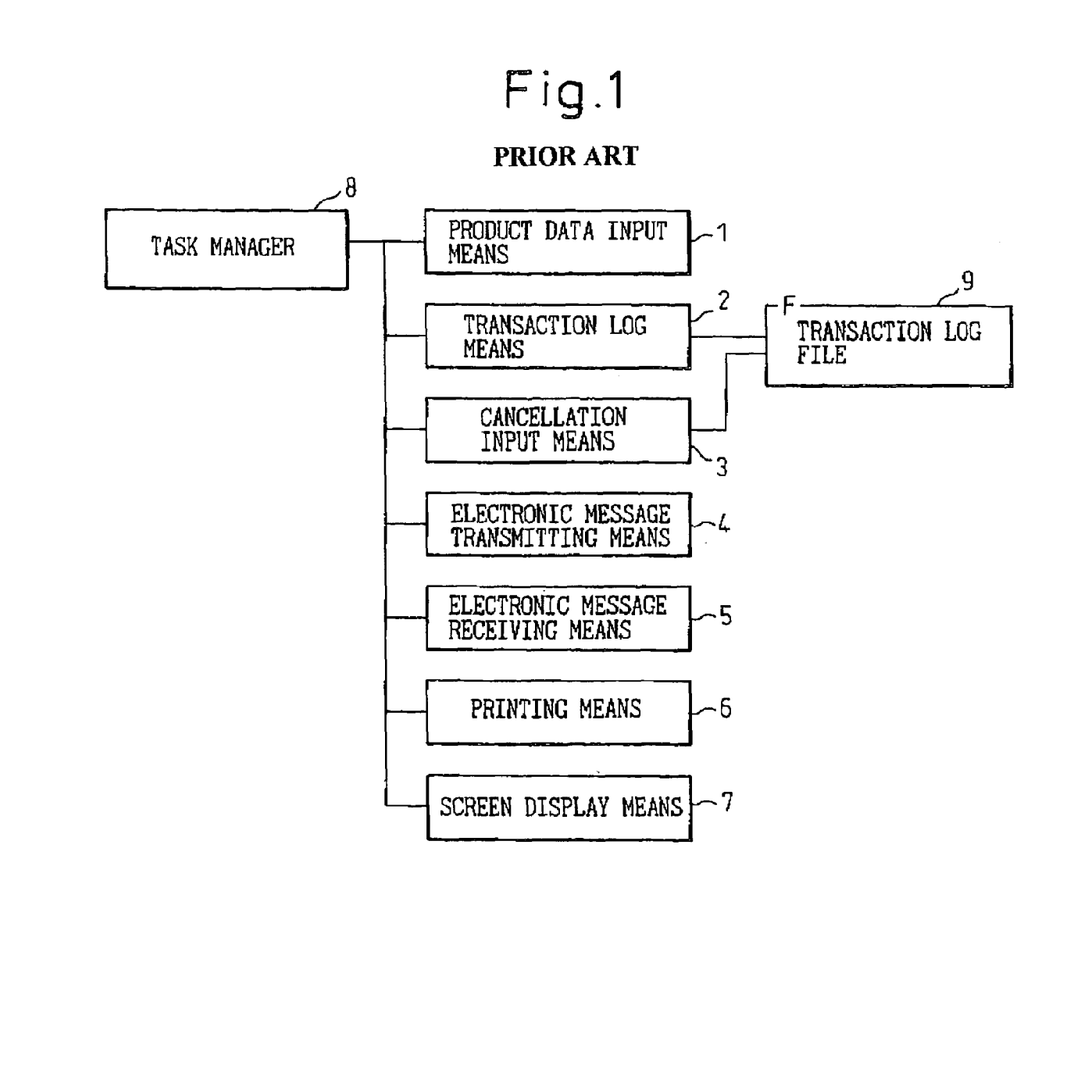
FIG. 1 is a block diagram showing the configuration of a prior art POS terminal.
Figure 2:
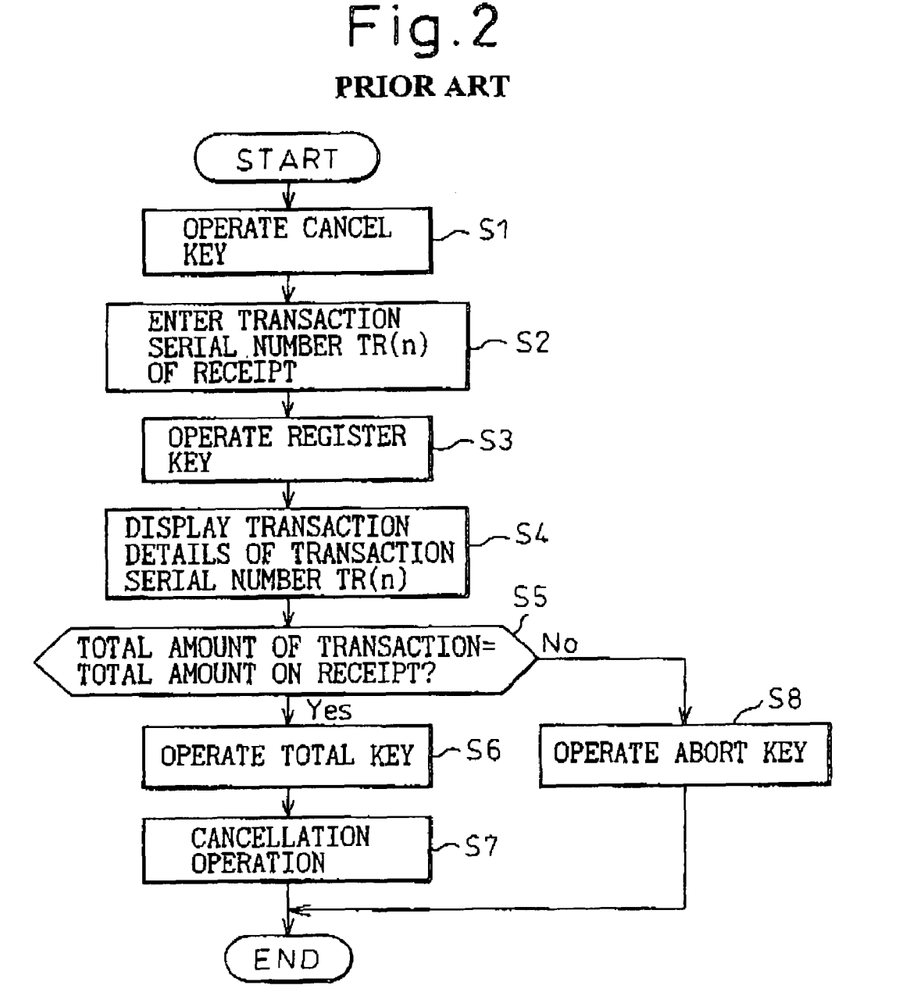
FIG. 2 is a flowchart for explaining a transaction cancellation operation in the prior art POS terminal.
Figure 3:
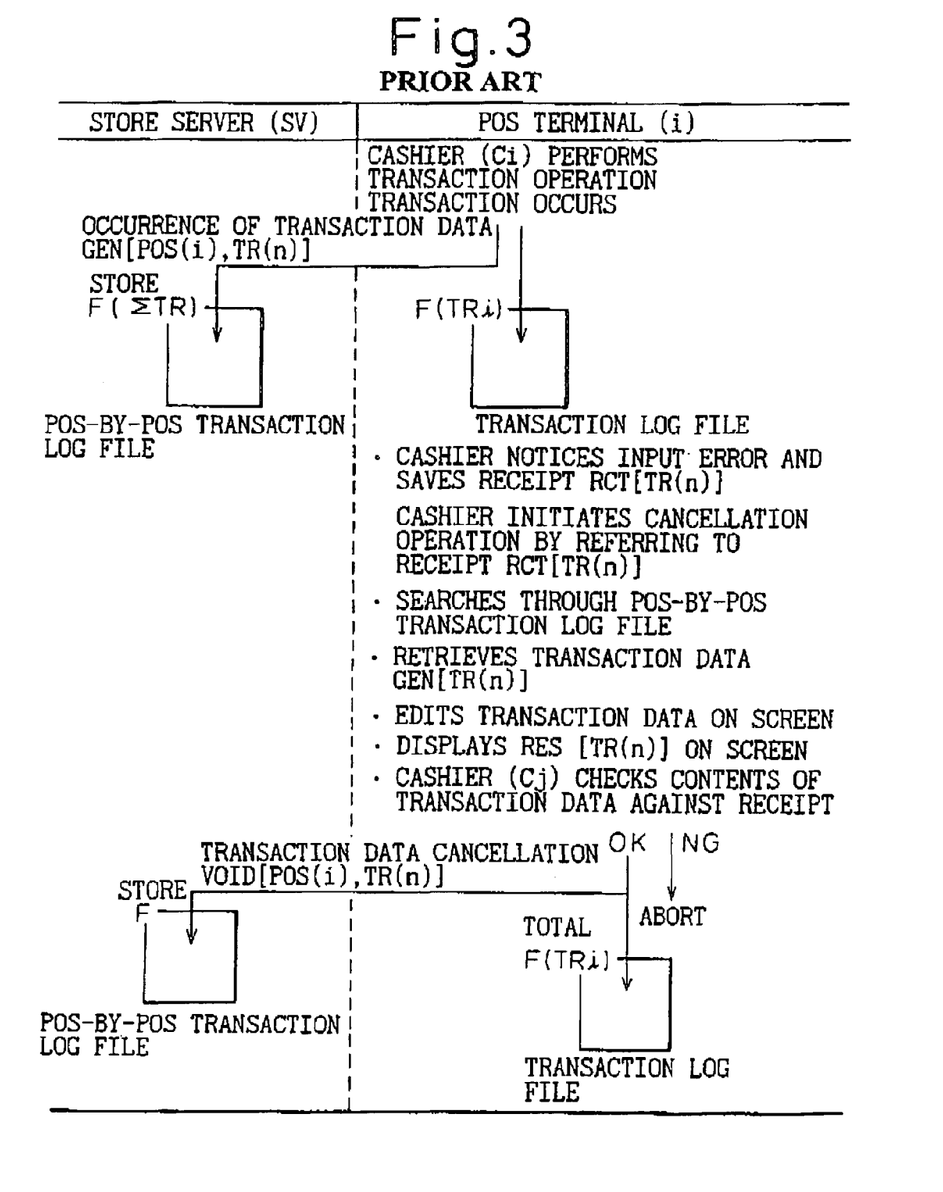
FIG. 3 is a diagram for explaining data flows occurring during the transaction cancellation operation in the prior art POS system.

FIG. 1 is a block diagram showing the configuration of a prior art POS terminal, FIG. 2 is a flowchart illustrating the processing performed at the POS terminal for the cancellation of a sales transaction, and FIG. 3 is a diagram showing data flows between the store server (SV) and the POS terminal (i) from which the cancellation operation is performed.

As shown in FIG. 1, the prior art POS terminal comprises a product transaction data input means 1, a transaction log means 2, a cancellation input means 3, an electronic message transmitting means 4 and electronic message receiving means 5 for transmitting and receiving electronic messages to and from the store server (not shown), a printing means 6, and a screen display means 7; the above-listed means are controlled by a task manager 8. The POS terminal further includes a transaction log file 9 for recording the results of the operations performed by the transaction log means 2 and the cancellation input means 3.

As shown in the flowchart of FIG. 2, to cancel a transaction at the POS terminal, first a cancel key is operated in step S1, the transaction serial number TR(n) of the receipt for the transaction to be canceled is entered in step S2, and a register key is operated in step S3 to determine the initiation of the cancellation operation. With the operation of the register key, the details of the transaction corresponding to the transaction serial number TR(n) are displayed on the screen of the display or the like (step S4); then, while viewing the screen, the operator determines whether the contents of the transaction serial number TR(n) match the contents of the receipt that is to be canceled (step S5).

When both contents match (Yes in step S5), a total key is operated (S6) to execute the cancellation operation (S7). If the answer is No in step S5, an abort key is operated (S8) to abort the cancellation operation.

While the series of operations shown in FIG. 2 is being performed at the POS terminal (i), data transfers such as shown in FIG. 3 are performed between the POS terminal (i) and the store server. First, when the operator (cashier) of the POS terminal (i) performs a transaction entering operation, and a transaction thus occurs at the POS terminal (i), transaction data TRi is written to the transaction log file (F(TRi)) maintained in the POS terminal (i) and, at the same time, a transaction data occurrence notification (Gen [POS (i), TR(n)]) is sent in the form of an electronic message to the store server, where the transaction data is written to a POS-by-POS transaction log file (FSTR).

Next, the operator notices an input error and saves the receipt (RCT [TR(n)]). When the flow of customers ceases, the operator (Ci) initiates the cancellation operation by referring to the receipt (RCT [TR(n)]). That is, the transaction log file is searched to retrieve the transaction data (GEN [TR(n)]), which is presented for display on the display screen (RES [TR(n)]). The operator (Ci) checks the displayed transaction data against the receipt and, if their contents match, operates the total key and writes the contents to the transaction log file F(TRi).

At the same time, a transaction data cancellation notification VOID [POS(i), TR(n)] is sent to the store server for writing to the POS-by-POS transaction log file.

As described above, in the prior art POS system, since the transaction data is stored in the POS terminal TR(i) that registered the transaction, if the transaction is to be canceled, the cancellation operation has had to be performed at that POS terminal TR(i).

However, in busy hours, for example, during the year end season when many customers line up in front of the cash register, if the sales data has to be corrected and re-entered by taking the receipt to the POS terminal where the sale was registered, it not only would involve a very cumbersome procedure for both the operator and the customer, but could also lead to errors when re-entering the data.

In view of this, it is traditionally practiced to accept a return from a customer or a request for correction of an erroneous input, for example, at a service counter or the like, and to issue to a correct receipt carrying the correct amount billed. The cancellation operation at the responsible POS terminal is performed at a later time, for example, when the POS terminal is not in use, or after the store is closed for the day. Customer convenience is thus given higher priority than the cancellation operation to be performed at the POS terminal. The cancellation operation is necessary to compute the total amount of sales registered at the POS terminal and totalize the sales for the entire store, but this is of no interest to the customer.

However, when the cancellation operation at the POS terminal is performed at a later time than the occurrence of the event requiring the cancellation operation, or after the store is closed for the day, the total amount of sales being reported at regular intervals of time during store hours does not reflect the actual sales figures. Furthermore, since it is necessary to provide a special counter such as a service counter, assign staff to the counter, and install a machine that can issue receipts, these provisions impose a great burden on relatively small supermarkets and other retail stores.

Furthermore, when correcting a transaction record for such reasons as a receipt input error or a returned product, since the transaction itself has had to be canceled once and correct transaction data has had to be re-entered for each product item, there has been the problem that re-entering data not only takes time but tends to incur input errors.

Accordingly, in the case of a POS system constructed from a plurality of POS terminals, there is a need for a POS system that allows corrections to be made to transactions from any POS terminal other than the POS terminal through which the transaction to be canceled or corrected was registered, that is, through which the purchase was registered. There is also a need for a POS system that allows transaction data to be canceled or corrected by correcting only necessary product data items, without having to cancel the entire data concerning that transaction.

SUMMARY OF THE INVENTION

The present invention has been devised to solve the above-outlined problems associated with the prior art POS system.

To attain the above object, the present invention provides a POS system comprising at least one store server and a plurality of POS terminals as clients to the store server, wherein each of the plurality of POS terminals includes means for transmitting transaction data to the store server as the transaction data is created at the POS terminal, means for querying the store server for transaction data relating to a transaction that occurred at another POS terminal, means for instructing the store server to cancel the transaction that occurred at that other POS terminal, and means for executing a transaction cancel instruction received from the store server to cancel a transaction that occurred at the POS terminal, and the store server includes means for receiving a transaction cancel instruction from a POS terminal other than the POS terminal at which the transaction occurred, and for transferring the transaction cancel instruction to the POS terminal at which said transaction occurred.

In the POS system of the above configuration, the POS terminal (j) queries the store server for the transaction that occurred at the POS terminal (i), and after confirming the contents of the transaction, the POS terminal (j) transmits the transaction cancel instruction to the POS terminal (i) via the store server, thereby making it possible to cancel the designated transaction at the POS terminal (i). After that, the corrected transaction data is entered at the POS terminal (j). In this way, the details of the transaction that occurred at the POS terminal (i) can, in effect, be corrected from the POS terminal (j).

Each of the plurality of POS terminals further includes means for applying a correction to the queried data relating to the transaction that occurred at that other POS terminal, and for transmitting the corrected transaction data to the store server as data relating to a new transaction that occurred at the POS terminal used to correct the transaction data.

This eliminates the need to re-enter the corrected transaction data after canceling the transaction, and the correction work is thus made easier.

DESCRIPTION OF THE PREFERRED EMBODIMENTS

The POS system of the present invention will be described below with reference to the accompanying drawings. In the drawings given hereinafter, constituent elements that are identical or similar to those in the prior art system shown in FIGS. 1, 2, and 3 will be designated by the same reference numerals, and a description of each such element will not be repeated here.

Figure 4:
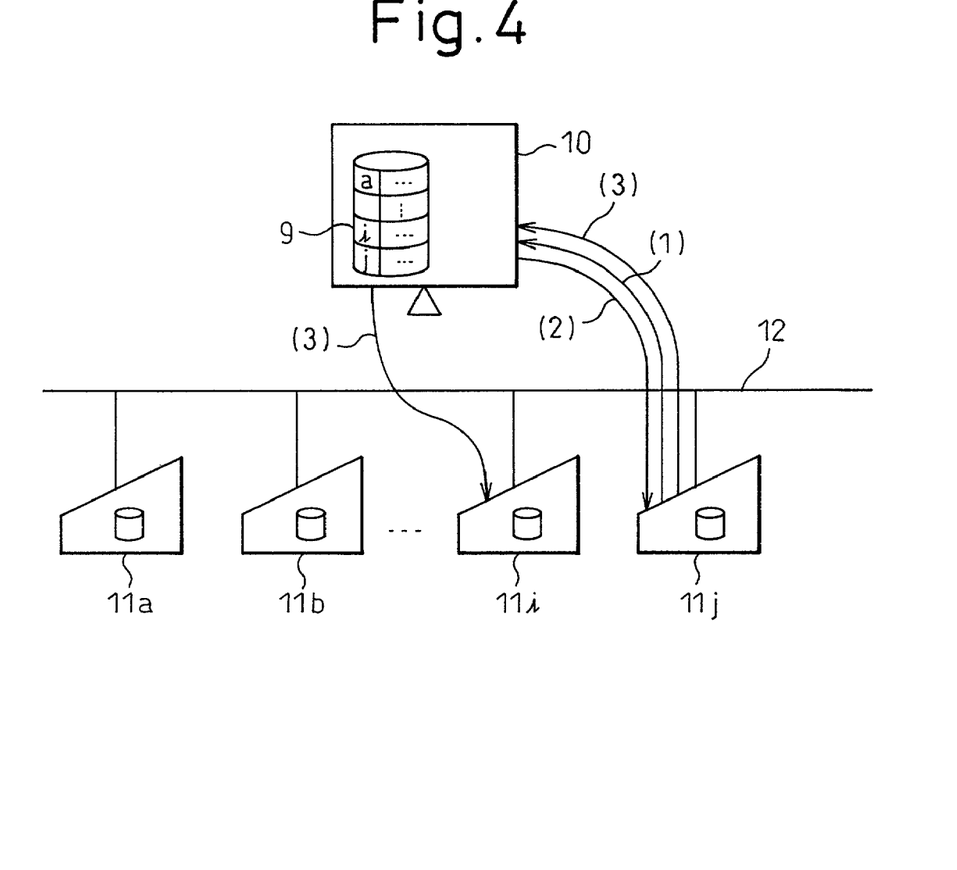
FIG. 4 is a diagram schematically showing the configuration of a POS system according to one embodiment of the present invention.

FIG. 4 is a diagram schematically showing the configuration of a POS system according to one embodiment of the present invention. As shown, this system comprises one store server 10, a plurality of POS terminals 11a, 11b, . . . , 11i, and 11j, and a line 12 interconnecting them. The store server 10 may be connected via a telephone line or a leased line to a central host computer which controls a plurality of store servers, but such a connection is not shown in this specification.

Figure 5:
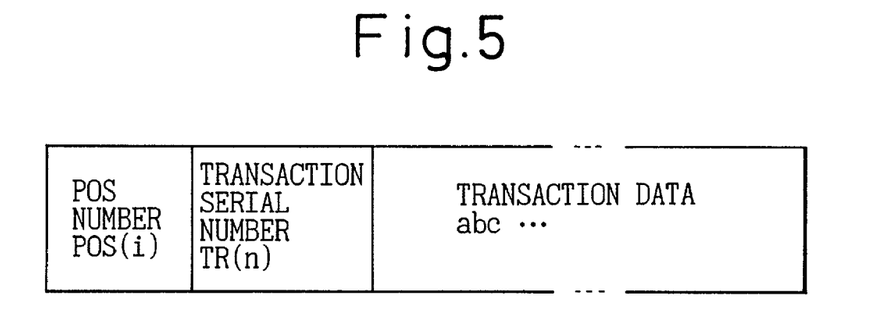
FIG. 5 is a diagram schematically showing the format of a transaction receipt.

The store server 10 includes a transaction log file 9 (see FIG. 6) for recording the contents of transactions registered at each POS terminal. FIG. 5 is a diagram showing the data format of the data stored in the transaction log file 9. As shown, the transaction data includes POS terminal number POS(i), transaction serial number TR(i) indicating the order of the transaction registered at that POS terminal, and transaction details consisting of the purchased product name, unit price, quantity, total amount, etc.

Figure 6:
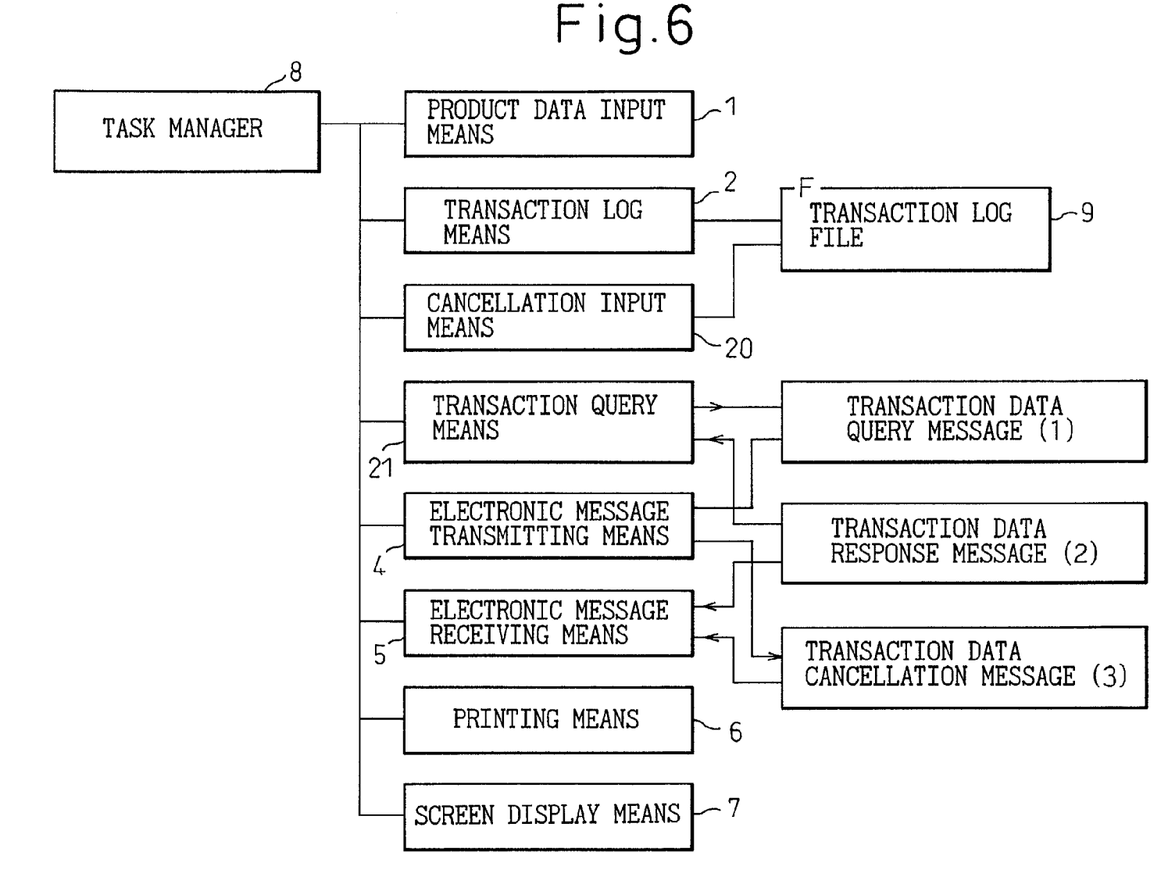
FIG. 6 is a block diagram showing the configuration of a POS terminal according to the one embodiment of the present invention.
Figure 7:
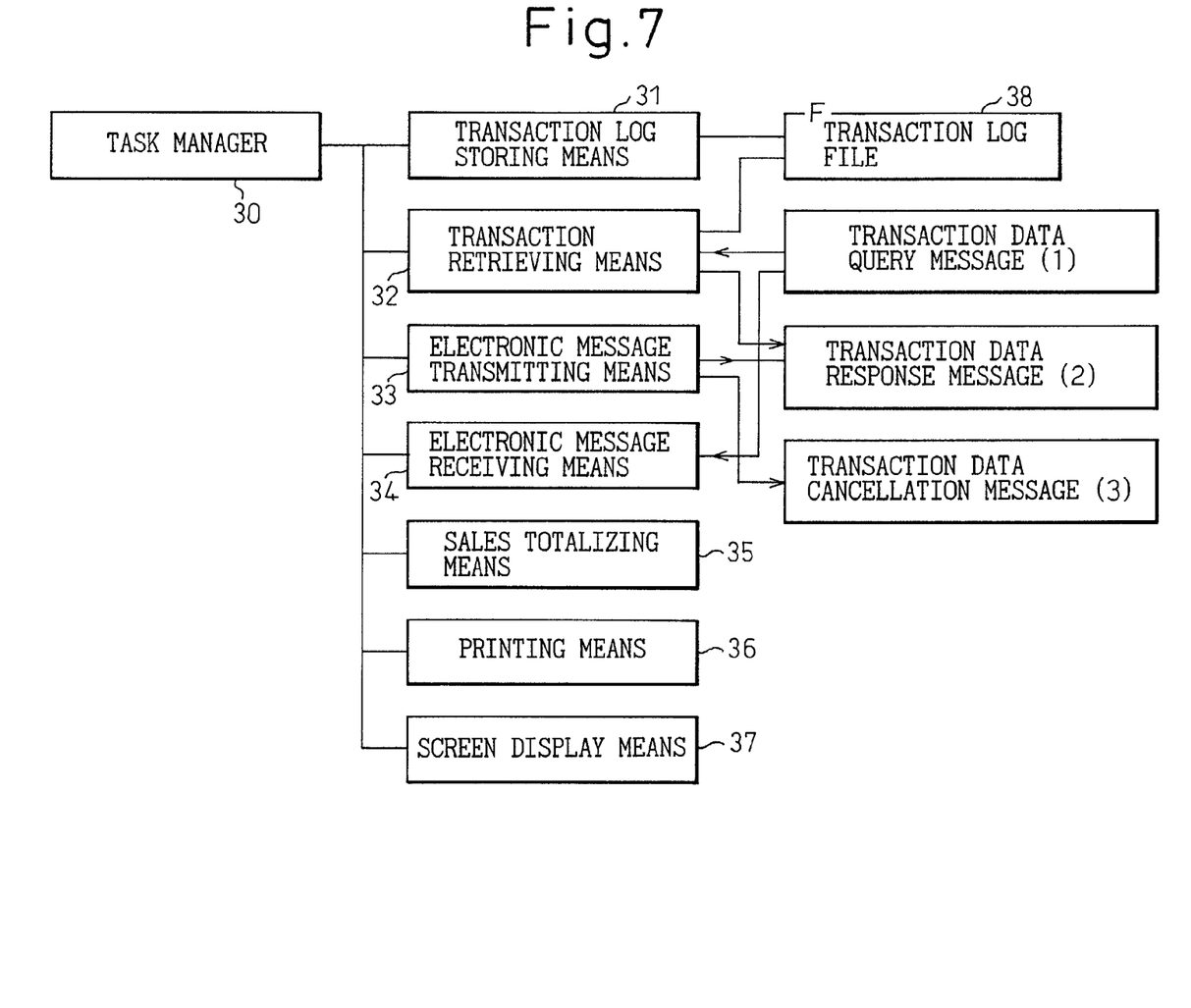
FIG. 7 is a block diagram showing the configuration of a store server according to the one embodiment of the present invention.

FIG. 6 is a block diagram showing the configuration of one embodiment of each POS terminal 11a, . . . , 11j shown in FIG. 4. FIG. 7 is a block diagram showing the configuration of one embodiment of the store server 10 shown in FIG. 4.

The POS terminal (i) according to the one embodiment of the present invention comprises a product data input means 1 for inputting the purchased product name, unit price, quantity, etc. through a barcode reader, a keyboard, or the like, a transaction log means 2 for storing transaction records in a transaction log file 9, a cancellation input means 20 for inputting a transaction cancellation, a transaction query means 21 for querying the server for the contents of the transaction to be canceled when the transaction is one registered through a POS terminal other than the POS terminal (i), electronic message transmitting and receiving means 4 and 5, a printing means 6, a screen display means 7, a task manager 8, and the transaction log file 9.

The cancellation of a transaction is done based on the receipt. As noted above, the receipt carries the details of the transaction, i.e., the product name, unit price, and quantity, as well as the POS number associated with the transaction and the transaction serial number indicating the order of the transaction registered at that POS terminal. The cancellation input means 20 accepts the input of the POS number POS(j) and transaction serial number TR(n) when, for example, a cancel key provided on the keyboard is operated.

The transaction query means 21 is a means for querying the server 10 for the transaction to be canceled when the transaction is one registered through a POS terminal POS(j) which is not the querying POS terminal, and has the function of transmitting a transaction data query message (1) to the server 10 and receiving a transaction data response message (2) from the server 10. Actual transmission and reception of the electronic messages are performed using the electronic message transmitting means 4 and the electronic message receiving means 5, respectively.

The electronic message receiving means 5 in this system further includes the function of receiving from the server 10 a transaction data cancellation message (3) for canceling the designated transaction recorded in the transaction log file 9 in the POS terminal.

FIG. 7 shows the configuration of the store server 10. The store server 10 comprises a transaction log storing means 31, a transaction retrieving means 32 for retrieving the transaction to be canceled, an electronic message transmitting means 33, an electronic message receiving means 34, a sales totalizing means 35, a printing means 36, a screen display means 37, and a transaction log file 38; the means listed above are managed by a task manager 30.

The transaction log storing means 31 receives transaction data from each POS terminal and stores the received data in the transaction log file 38. The transaction retrieving means 32 receives via the electronic message receiving means 34 the transaction data query message (1) transmitted from the POS terminal and searches through the transaction log file 38 to retrieve the designated transaction. The electronic message transmitting means 34 has the function of transmitting the transaction data response message (2), i.e., the result of the retrieval by the transaction retrieving means 32, to the querying POS terminal, while also transmitting the transaction data cancellation message (3) for directing the cancellation of the designated transaction to the POS terminal at which the transaction was originally registered.

The sales totalizing means 35 periodically searches through the transaction log file 38 to collect transaction data, and deduct any data designed for cancellation from the total amount of sales. The printing means 36 outputs necessary data to a printer, while the screen display means 37 outputs necessary data for display on the screen.

Figure 8:
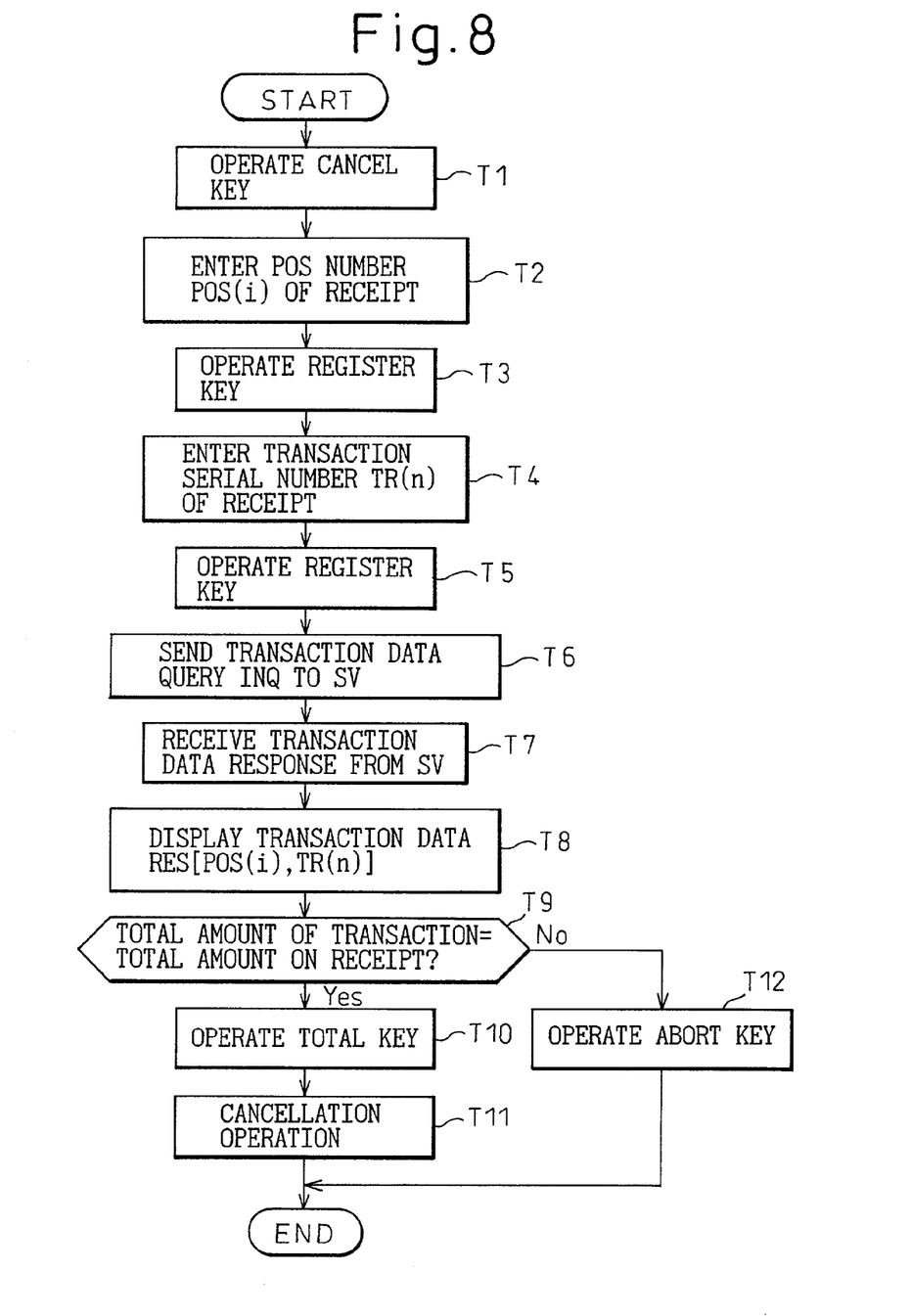
FIG. 8 is a flowchart for explaining a transaction cancellation operation in the POS terminal according to the one embodiment of the present invention.
Figure 9A:
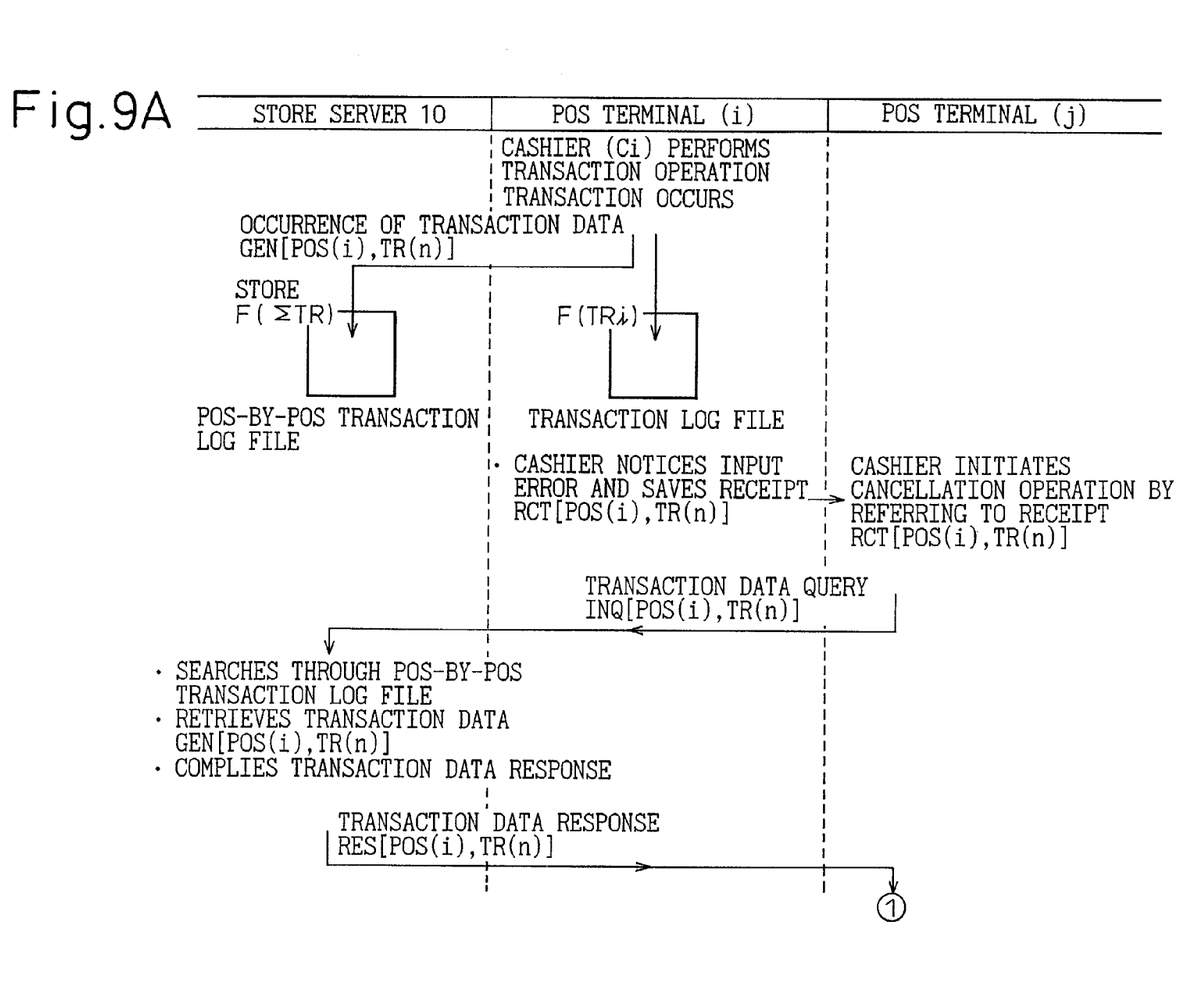
FIG. 9A is a first half diagram for explaining data flows occurring during the transaction cancellation operation in the POS system according to the one embodiment of the present invention.
Figure 9B:
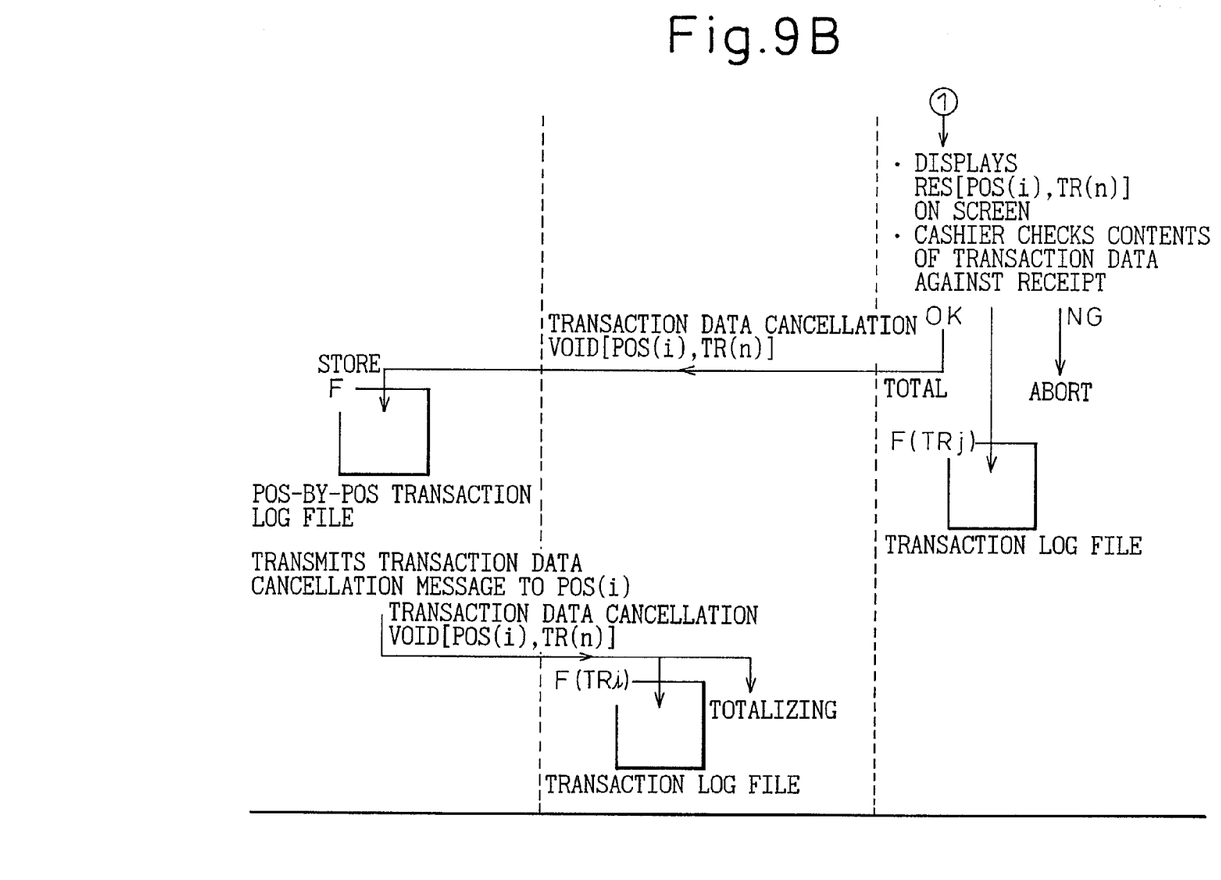
FIG. 9B is a latter half diagram for explaining data flows occurring during the transaction cancellation operation in the POS system according to the one embodiment of the present invention.

The operation of the POS system will be described with reference to FIGS. 8 and 9. FIG. 8 shows a flowchart for the cancellation operation performed at the POS terminal (j), and FIG. 9 shows data flows occurring between the store server 10, the POS terminal (i), and the POS terminal (j) when the processing is performed in accordance with the flowchart of FIG. 8. The illustrated example assumes the case where the receipt relating to the transaction to be canceled is issued at the POS terminal (i) and the cancellation of the transaction is done at the POS terminal (j).

As shown in FIGS. 9A and 9B, when the operator (cashier) Ci enters data on a customer purchased product into the POS terminal (i), and a transaction thus occurs at the POS terminal (i), the contents of the transaction (TRi) are stored via the transaction log means 2 into the transaction log file 9 in the POS terminal (F(TRi)). At the same time, the information is sent from the POS terminal (i) to the store server 10 in the form of an electronic message indicating the occurrence of the transaction data GEN [POS(i), TR(n)], and is stored in the transaction log file 38 as transaction data for that POS terminal (F(STR)].

In this state, the operator of the POS terminal (i) notices an input error and saves the receipt RCT [POS(i), TR(n)]. Next, another operator, for example, at the accounting department initiates the cancellation operation for the transaction relating to that receipt by using the POS terminal (j) installed at the accounting department.

As shown in FIG. 8, the operator of the POS terminal (j) first operates the cancel key in step T1. Then, in accordance with the guide displayed, for example, on the display screen with the above key operation, the operator enters the POS terminal number POS(i) carried on the receipt for the transaction to be canceled, and operates the register key to determine the input (step T3). Next, in accordance with the guide displayed on the screen, for example, the operator enters the transaction serial number TR(n) of the receipt (step T4), and operates the register key to determine the input (step T5). These operations are performed at the cancellation input means 20 shown in FIG. 6.

When the above series of operations is completed, the transaction query means 21 in the POS terminal (j) transmits the transaction data query message (1) via the electronic message transmitting means 4 to the server 10 to make a transaction data query INQ [POS(i), TR(n)] (step T6).

The server 10 receives this electronic message, searches through the POS-by-POS transaction log file, retrieves the corresponding transaction data GEN [POS(i), TR(n)], compiles a transaction data response, and transmits it to the POS terminal (j) in the form of the transaction data response message (2).

When the POS terminal (j) receives the corresponding transaction data GEN [POS(i), TR(n)] from the server 10 (step T7), the contents of the transaction data are displayed on the screen (RES [POS(i), TR(n)]) (step T8). The operator of the POS terminal (j) determines whether the displayed total amount of transaction matches the total amount carried on the receipt (step T9), and if they match (Yes), the operator operates the total key (step T10) and carries out the cancellation operation (step T11). If the total amounts do not match in step T9 (No), the operator operates the abort key (step T12) to abort the cancellation operation.

The cancellation operation is accomplished in the following manner. At the POS terminal (j), the transaction log means 2 writes cancellation data (F(TRj)) to the log file 9. At the same time, the POS terminal (j) transmits the transaction data cancellation message VOID [POS(i), TR(n)](3) to the server 10 by using the electronic message transmitting means 4.

At the server 10, the electronic message receiving means 34 receives the transaction data cancellation message VOID [POS(i), TR(n)], and the transaction log storing means 31 writes the contents of the received message to the transaction log file 38 as POS terminal-specific information. At the same time, the sales totalizing means 35 deducts the total amount of the canceled transaction from the total sales amount so far computed.

Further, using the electronic message transmitting means 33, the server 10 transmits the contents of the received message, i.e., the transaction data cancellation message VOID [POS(i), TR(n)], to the POS terminal (i) that issued the receipt, and the cancellation message is stored in the transaction log file 9 maintained in the POS terminal (i). At the POS terminal (i), a total amount correction operation is also performed.

In this way, the transaction originally registered at the POS terminal (i) can be canceled through the POS terminal (j). After the transaction has been canceled, correct transaction data is entered at the POS terminal (j) and recorded in its log file; at the same time, the information is sent to the server 10 and stored in the log file maintained in the server 10.

In the above embodiment, after the transaction has been canceled, all the contents of the receipt, including the corrected item, must be re-entered, but transaction data can be corrected without re-entering the contents of the receipt that do not need correcting. An embodiment accomplishing this will be described below with reference to FIGS. 10 to 12.

Figure 10:
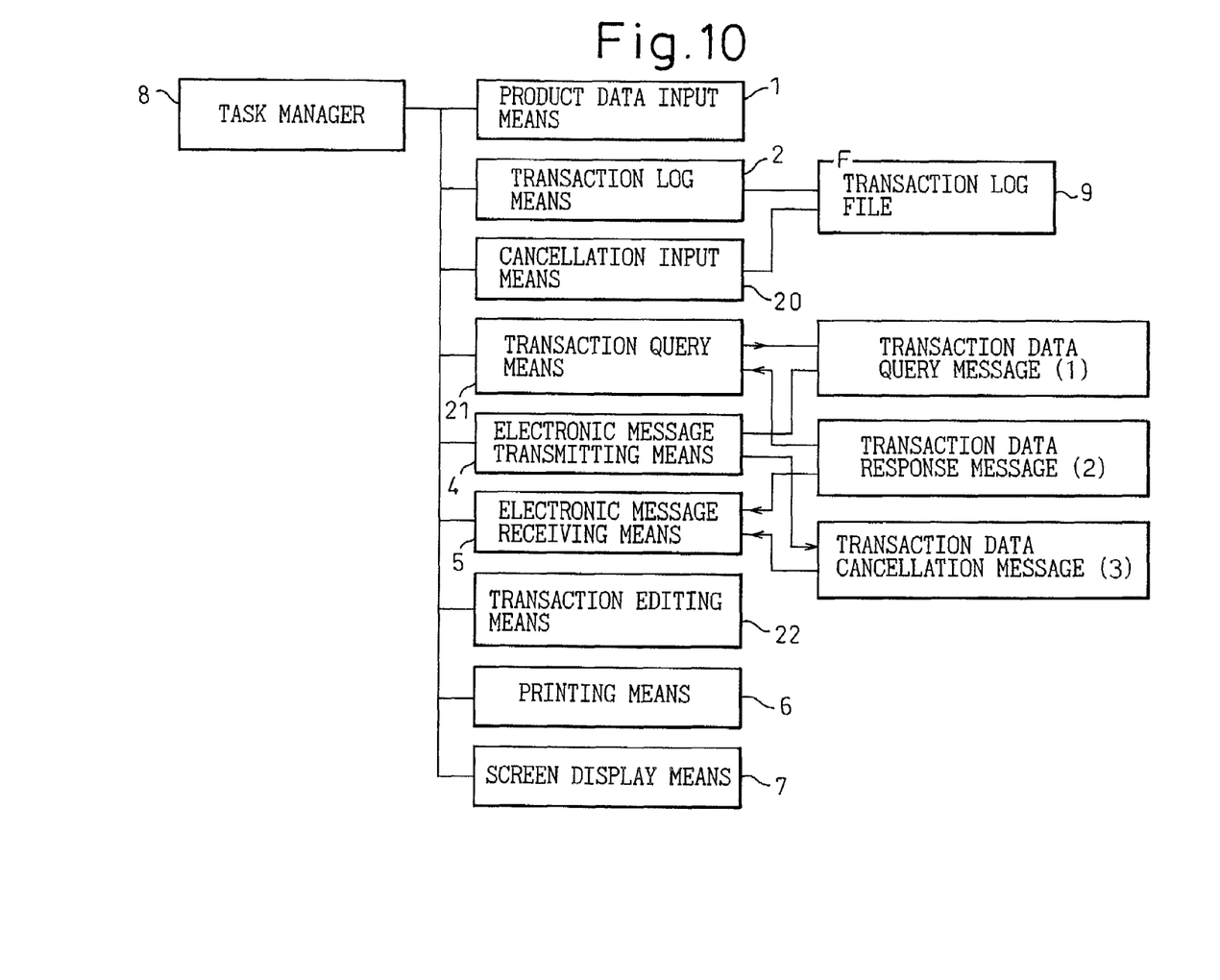
FIG. 10 is a block diagram showing the configuration of a POS terminal according to a second embodiment of the present invention.

FIG. 10 is a diagram showing the configuration of a POS terminal which is used in a POS system according to a second embodiment of the present invention. This POS terminal differs from the POS terminal of the first embodiment of the present invention shown in FIG. 6, by the inclusion of a transaction editing means 22. The transaction editing means 22 has the function of enabling each individual item of the transaction data displayed on the screen display means 7 to be corrected, for example, by operating an edit key provided on the keyboard.

Figure 11:
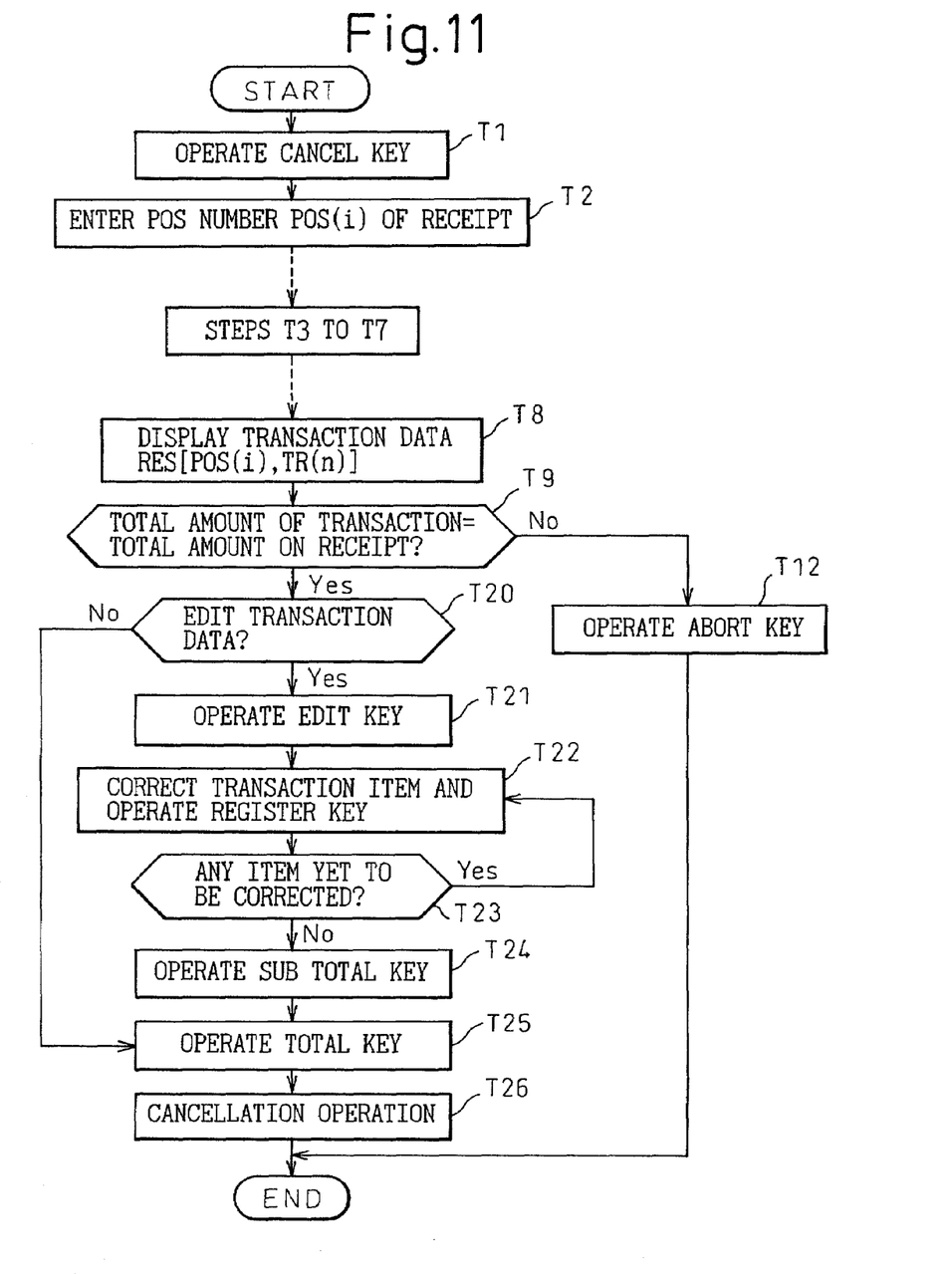
FIG. 11 is a flowchart for explaining a transaction editing operation in the POS terminal according to the second embodiment of the present invention.
Figure 12A:
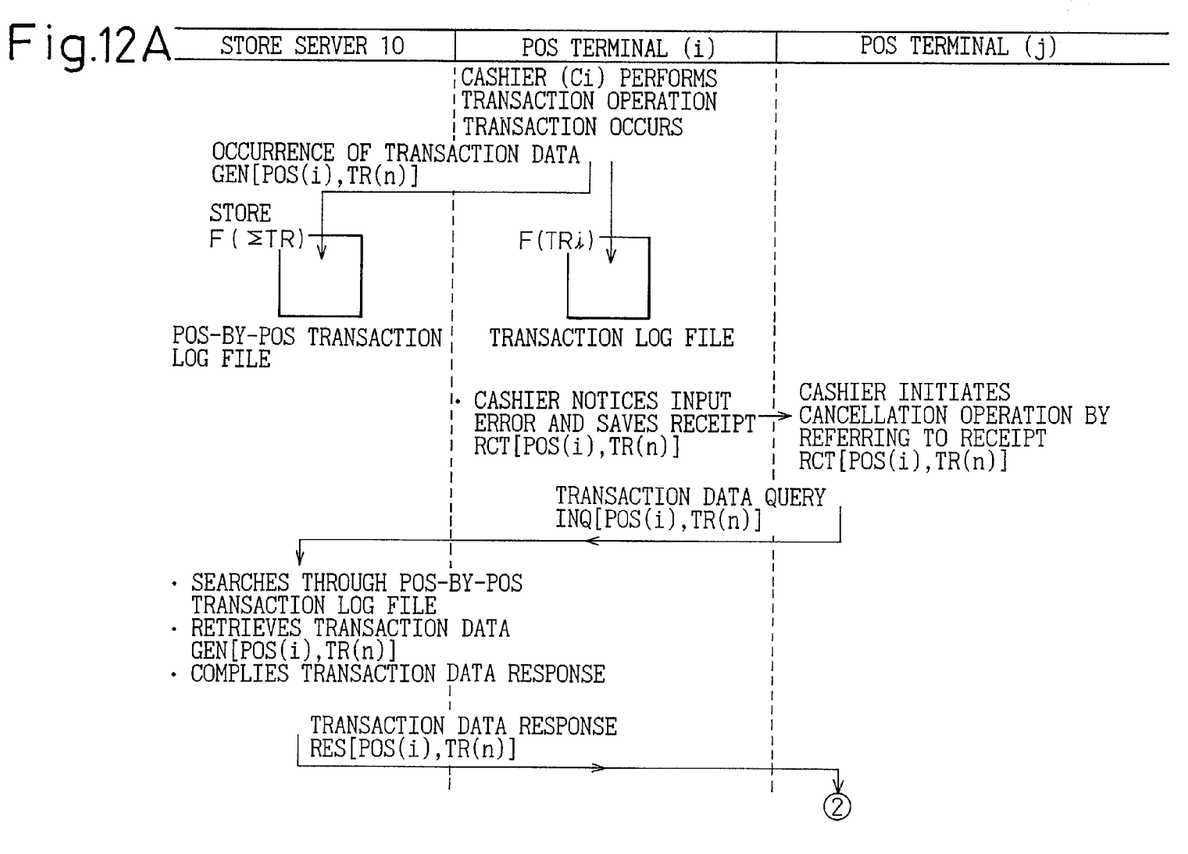
FIG. 12A is a first half diagram for explaining data flows occurring during the transaction editing operation in the POS system according to the second embodiment of the present invention.
Figure 12B:
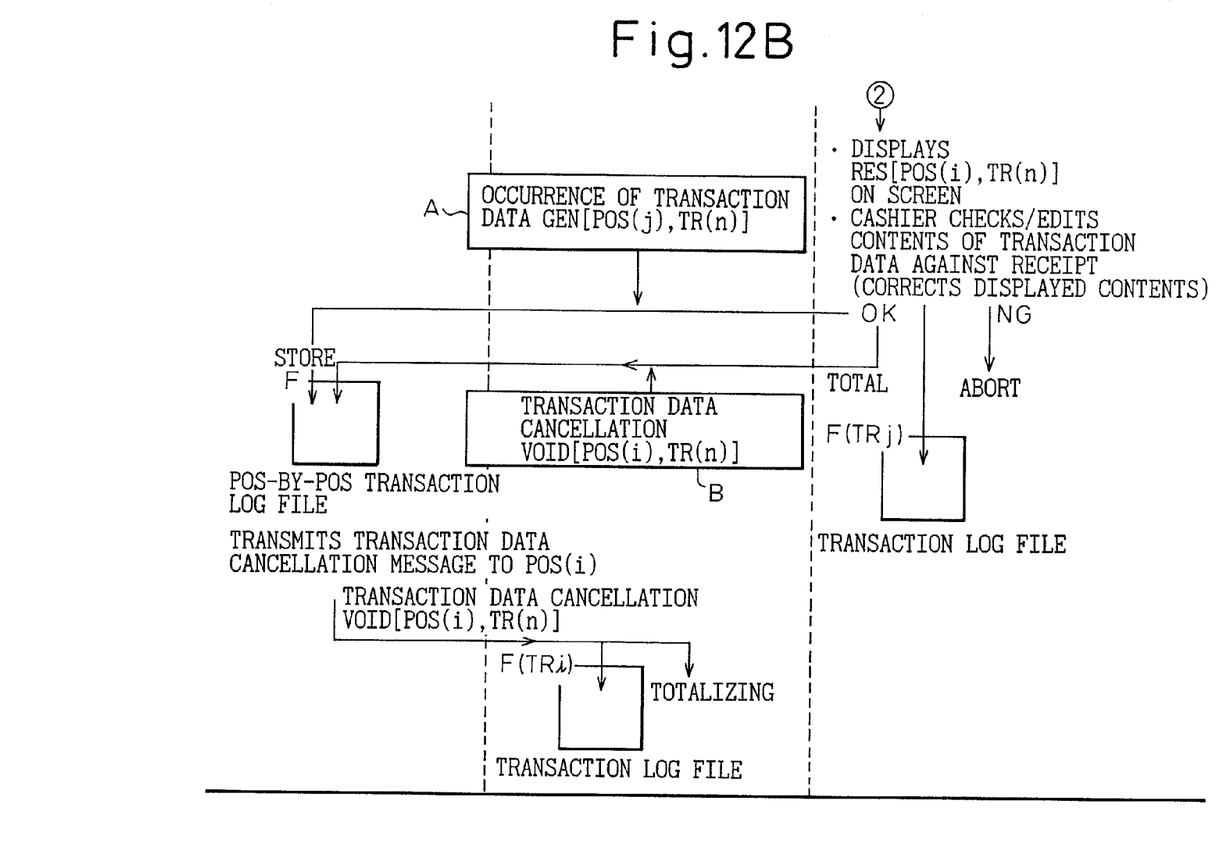
FIG. 12B is a latter half diagram for explaining data flows occurring during the transaction editing operation in the POS system according to the second embodiment of the present invention.

The operation of the POS system according to the second embodiment of the present invention, which has the POS terminal of the configuration shown in FIG. 10, will be described below with reference to FIGS. 11 and 12. FIG. 11 shows a flowchart for the operation performed at the POS terminal (j), and FIGS. 12A and 12B show data flows occurring between the store server 10, the POS terminal (i), and the POS terminal (j) when the processing is performed in accordance with the flowchart of FIG. 11.

The flowchart is constructed assuming the case where the receipt that will need correction is issued at the POS terminal (i) and the correction is done at the POS terminal (j). As is apparent from FIGS. 11 and 12, the process starting from the time the POS terminal (j) queries the store server 10 for the contents of the receipt created at the POS terminal (i), until the contents are displayed on the screen display means of the POS terminal (j), is the same as that in the first embodiment of the present invention shown in FIGS. 8 and 9, and therefore, the description of the corresponding part of the process will not be repeated here.

In FIG. 11, when the contents of the transaction (RES [POS(i), TR(n)], originally registered at the POS terminal (i) and needing correction, are displayed on the display of the POS terminal (j) in step T8, the operator of the POS terminal (j) determines whether the displayed total amount of the transaction matches the total amount carried on the receipt (step T9), and if they do not match (No), the operator operates the abort key in step T12, whereupon all the processing is stopped to terminate the process.

On the other hand, if the total amount of the transaction matches the total amount carried on the receipt (Yes), the operator of the POS terminal (j) determines in step T20 whether the transaction data should be edited or not. If the answer is Yes in step T20, that is, if it is determined that the transaction data should be edited, then in step T21 the operator operates the edit key provided, for example, on the keyboard, to activate the transaction editing means 22 in the POS terminal shown in FIG. 10 so that the transaction data shown on the display can be corrected.

In step T22, the operator specifies one transaction item, enters correct data, and determines the entered data by operating the register key, and in step T23, the operator determines whether there is any transaction item remaining to be corrected; if the answer is Yes, step T22 is repeated. After correcting all necessary items in this manner, in step T24 the operator operates the sub total key to determine the total amount for that receipt. The thus determined transaction data is stored in the transaction log file 9 within the POS terminal (j) as new transaction data that occurred at the POS terminal (j), and at the same time, the data is transmitted to the store server 10 as data relating to a new transaction (see A in FIG. 12). At the store server 10, the received data is stored in the POS-by-POS transaction log file 38 within the store server as a new transaction that occurred at the POS terminal (j).

Next, in step T26, the total key is operated. This key operation is performed to activate the transaction cancellation operation (step T26) shown in FIG. 11. The cancellation operation is performed in the same way as that performed in the first embodiment of the present invention. That is, the POS terminal (j) transmits the transaction data cancellation message VOID [POS(i), TR(n)] (see B in FIG. 12) to the server 10 by using the electronic message transmitting means 4.

At the server 10, the electronic message receiving means 34 receives the transaction data cancellation message VOID [POS(i), TR(n)], and the transaction log storing means 31 writes the contents of the received message to the transaction log file 38 as POS terminal-specific information. When totalizing the sales data, the sales totalizing means 35 deducts the total amount of the canceled transaction from the total sales amount so far computed.

Further, using the electronic message transmitting means 33, the server 10 transmits the contents of the received message, i.e., the transaction data cancellation message VOID [POS(i), TR(n)], to the POS terminal (i) that issued the receipt, and the cancellation message is stored in the transaction log file 9 maintained in the POS terminal (i). At the POS terminal (i), a total amount correction operation is also performed.

In this way, the transaction originally registered at the POS terminal (i) can be canceled through the POS terminal (j). No further operation is needed since the corrected receipt data is already stored in the transaction log file within the server 10 as well as the POS terminal (j).

If No is selected in step T20, the process jumps to step T25, where the total key is operated to perform the cancellation operation (step T26) as in the case of the first embodiment, to cancel the transaction itself. When correcting the contents of the transaction, the operator thereafter enters correct transaction data.

As described above, according to the POS system of the present invention, any transaction, including a sales transaction, originally registered at any POS terminal, can be canceled through any other POS terminal in the POS system. It is also possible to correct transaction data without canceling the entire transaction. As a result, transaction data can be readily corrected when an operator's input error is found or when a purchased product is returned by a customer, and an easy-to-operate POS system can thus be provided.

The invention claimed is:

1. A POS system comprising:
  at least one store server wherein said at least one store server comprises:
  means for storing transaction data transmitted from each POS terminal,
  means for receiving and executing a transaction cancel instruction from a first POS terminal other than a second POS terminal at which a first transaction occurred, and
  means for transferring said transaction cancel instruction to said second POS terminal at which said first transaction occurred,
  and
  a plurality of POS terminals as clients to said at least one store server, wherein each of said plurality of POS terminals comprises:
  means for inputting transaction data;
  means for storing said transaction data as first transaction data relating to a transaction that occurred at a first POS terminal;
  means for transmitting said transaction data to said at least one store server;
  means for querying said at least one store server and requesting second transaction data relating to a transaction that occurred at a second POS terminal;
  means for instructing said at least one store server to cancel the second transaction that occurred at said second POS terminal;
  means for executing a transaction cancel instruction received from said at least one store server to cancel said second transaction that occurred at said second POS terminal;
  means for applying a correction to said second transaction data;
  means for transmitting said corrected transaction data to said at least one store server as third transaction data relating to a new transaction that occurred at said first POS terminal, said corrected transaction data being stored at said first POS terminal as transaction data relating to said new transaction 2. A POS system as claimed in claim 1, wherein, when a cancel instruction for a transaction is received from a POS terminal, said at least one store server stores cancellation information in an area of said storing means that corresponds to the POS terminal through which said transaction was originally registered.

3. A POS system as claimed in claim 2, wherein said at least one store server comprises means for totalizing sales by periodically searching through transaction data stored in said storing means.

4. A POS system as claimed in claim 3, wherein when said transaction cancellation information is stored in said storing means, said sales totalizing means in said at least one store server deducts said transaction from said totalized sales.

5. A POS terminal comprising:
  means for inputting transaction data;
  means for storing said transaction data as first transaction data relating to a transaction that occurred at a first POS terminal;
  means for transmitting said transaction data to said at least one store server;
  means for querying said at least one store server and requesting second transaction data relating to a transaction that occurred at a second POS terminal;
  means for instructing said at least one store server to cancel the second transaction that occurred at said second POS terminal;
  means for executing a transaction cancel instruction received from said at least one store server to cancel said second transaction that occurred at said second POS terminal;
  means for applying a correction to said second transaction data;
  means for transmitting said corrected transaction data to said at least one store server as third transaction data relating to a new transaction that occurred at said first POS terminal, said corrected transaction data being stored at said first POS terminal as transaction data relating to said new transaction.

* * * * *